(12) United States Patent
Jang et al.

(10) Patent No.: US 11,824,422 B2
(45) Date of Patent: Nov. 21, 2023

(54) DRIVE MOTOR OF ELECTRIC VEHICLE HAVING INVERTER HOUSING MOUNTED THEREIN

(71) Applicant: NEW MOTECH CO., LTD., Gwangju (KR)

(72) Inventors: Jeong Cheol Jang, Gwangju (KR); Ji Min Lee, Gwangju (KR); Min Ho Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 441 days.

(21) Appl. No.: 17/292,006

(22) PCT Filed: Jun. 7, 2019

(86) PCT No.: PCT/KR2019/006900
§ 371 (c)(1),
(2) Date: May 7, 2021

(87) PCT Pub. No.: WO2020/246648
PCT Pub. Date: Dec. 10, 2020

(65) Prior Publication Data
US 2021/0313860 A1 Oct. 7, 2021

(30) Foreign Application Priority Data
Jun. 3, 2019 (KR) .......................... 10-2019-0065520

(51) Int. Cl.
*H02K 5/20* (2006.01)
*H02K 5/24* (2006.01)
(Continued)

(52) U.S. Cl.
CPC .............. *H02K 5/24* (2013.01); *B60K 1/00* (2013.01); *B60K 11/02* (2013.01); *H02K 5/203* (2021.01);
(Continued)

(58) Field of Classification Search
CPC .. H02K 5/00; H02K 5/04; H02K 5/20; H02K 5/203; H02K 5/24; H02K 5/26;
(Continued)

(56) References Cited

U.S. PATENT DOCUMENTS 5,331,239 A * 7/1994 Kwun ..................... H02K 17/30
318/400.14
2009/0267432 A1* 10/2009 Henry ..................... H02K 5/225
310/71
(Continued)

FOREIGN PATENT DOCUMENTS

JP 2009-283297 A 12/2009
JP 2019-050704 A 3/2019
(Continued)

OTHER PUBLICATIONS

Goto, Machine Translation of JP2019050704, Mar. 2019 (Year: 2019).*
(Continued)

*Primary Examiner* — Eric Johnson
(74) *Attorney, Agent, or Firm* — Revolution IP, PLLC

(57) ABSTRACT

A drive motor includes an inverter housing mounted therein, which couples an inverter housing to the top or side of a drive motor frame, wherein the inverter coupling bracket includes an inverter housing surface-contacting frame in which support gaps of first and second floor frames, surface-contacting the circumferential surface of a flange coupled to one end of the drive motor frame and the circumferential surface of a bracket coupled to the other end of the drive motor frame in the longitudinal direction, are integrally formed, and an arc-shaped drive motor frame circumferential surface-contacting portion is formed on the lower surface of the inverter housing surface-contacting frame, fixing pieces inclined inward are formed at the left and right ends of the first and second floor frames, respectively, and a fixing
(Continued)

protruding piece is formed at each of the front and rear ends of the inverter housing surface-contacting frame.

5 Claims, 8 Drawing Sheets

(51) Int. Cl.
    *H02K 9/19*     (2006.01)
    *H02K 11/33*     (2016.01)
    *B60K 1/00*     (2006.01)
    *B60K 11/02*     (2006.01)

(52) U.S. Cl.
    CPC ............... *H02K 9/19* (2013.01); *H02K 11/33* (2016.01); *B60K 2001/006* (2013.01)

(58) Field of Classification Search
    CPC . H02K 7/06; H02K 9/19; H02K 11/30; H02K 11/33; H02K 2213/12; B60K 1/00; B60K 11/02; B60K 2001/006
    See application file for complete search history.

(56) References Cited

U.S. PATENT DOCUMENTS

| | | | |
|---|---|---|---|
| 2014/0202781 A1 | 7/2014 | Soma et al. | |
| 2015/0333602 A1* | 11/2015 | Mohr | H02K 5/203 310/68 B |
| 2023/0026158 A1* | 1/2023 | Momoi | H02K 11/33 |

FOREIGN PATENT DOCUMENTS

| | | |
|---|---|---|
| KR | 10-2014-0058677 A | 5/2014 |
| KR | 10-1531525 B1 | 6/2015 |
| KR | 10-2017-0082914 A | 7/2017 |
| KR | 10-2017-0140320 A | 12/2017 |
| KR | 10-2018-0061991 A | 6/2018 |
| KR | 10-2018-0103633 A | 9/2018 |

OTHER PUBLICATIONS

International Search Report for PCT/KR2019/006900 dated Mar. 2, 2020 from Korean Intellectual Property Office.

* cited by examiner

[Fig. 1]
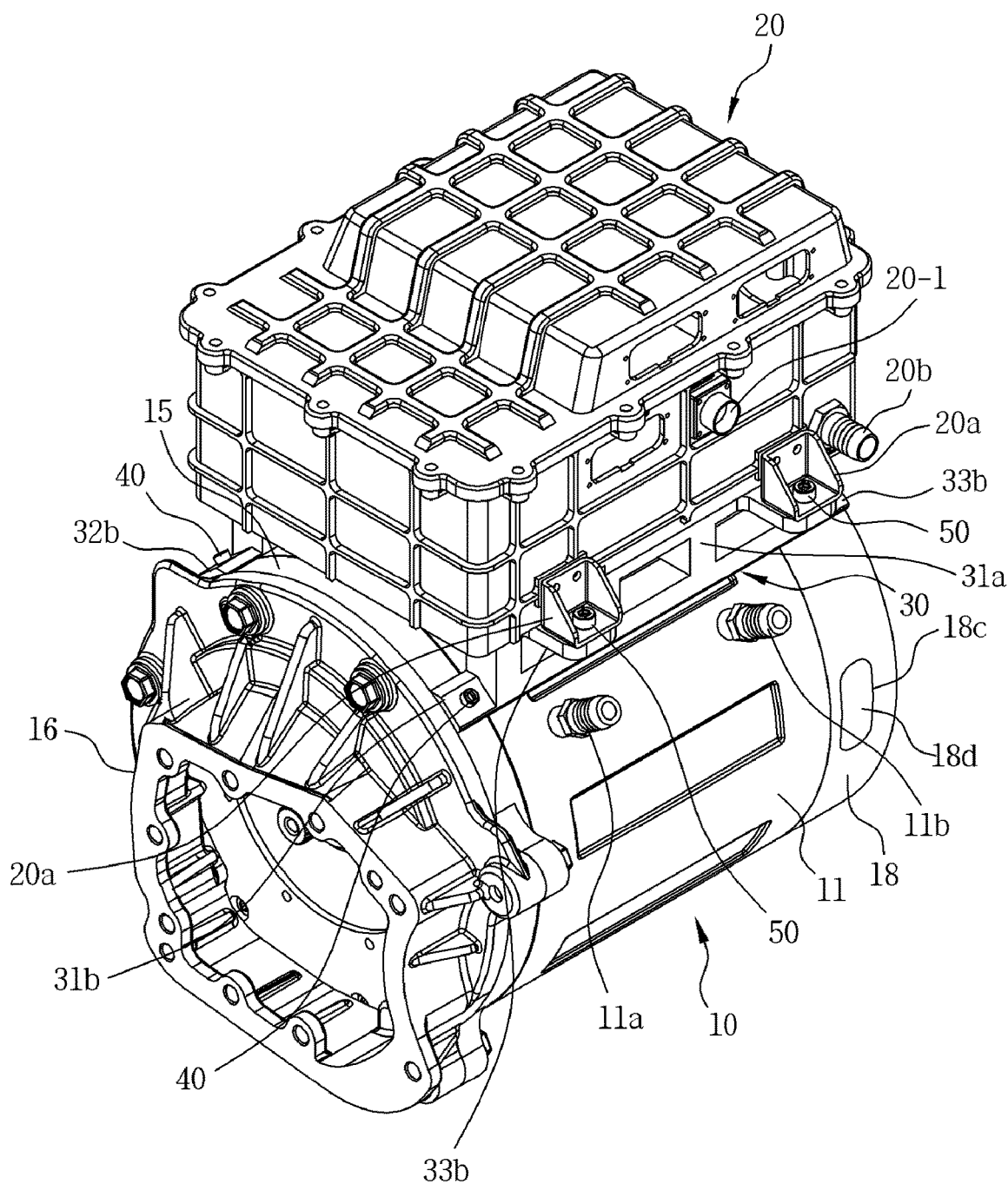

[Fig. 2]
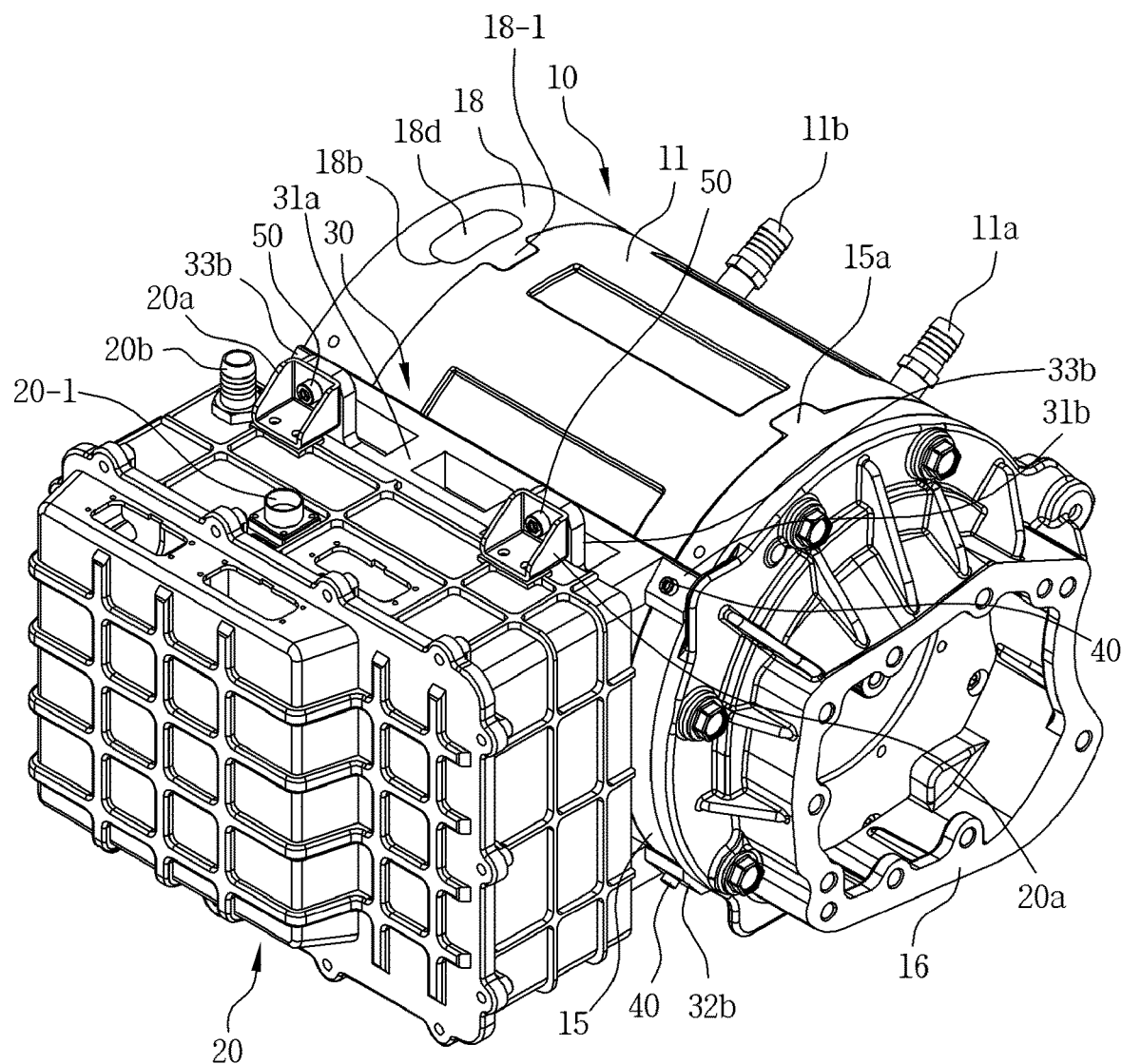

[Fig. 3]
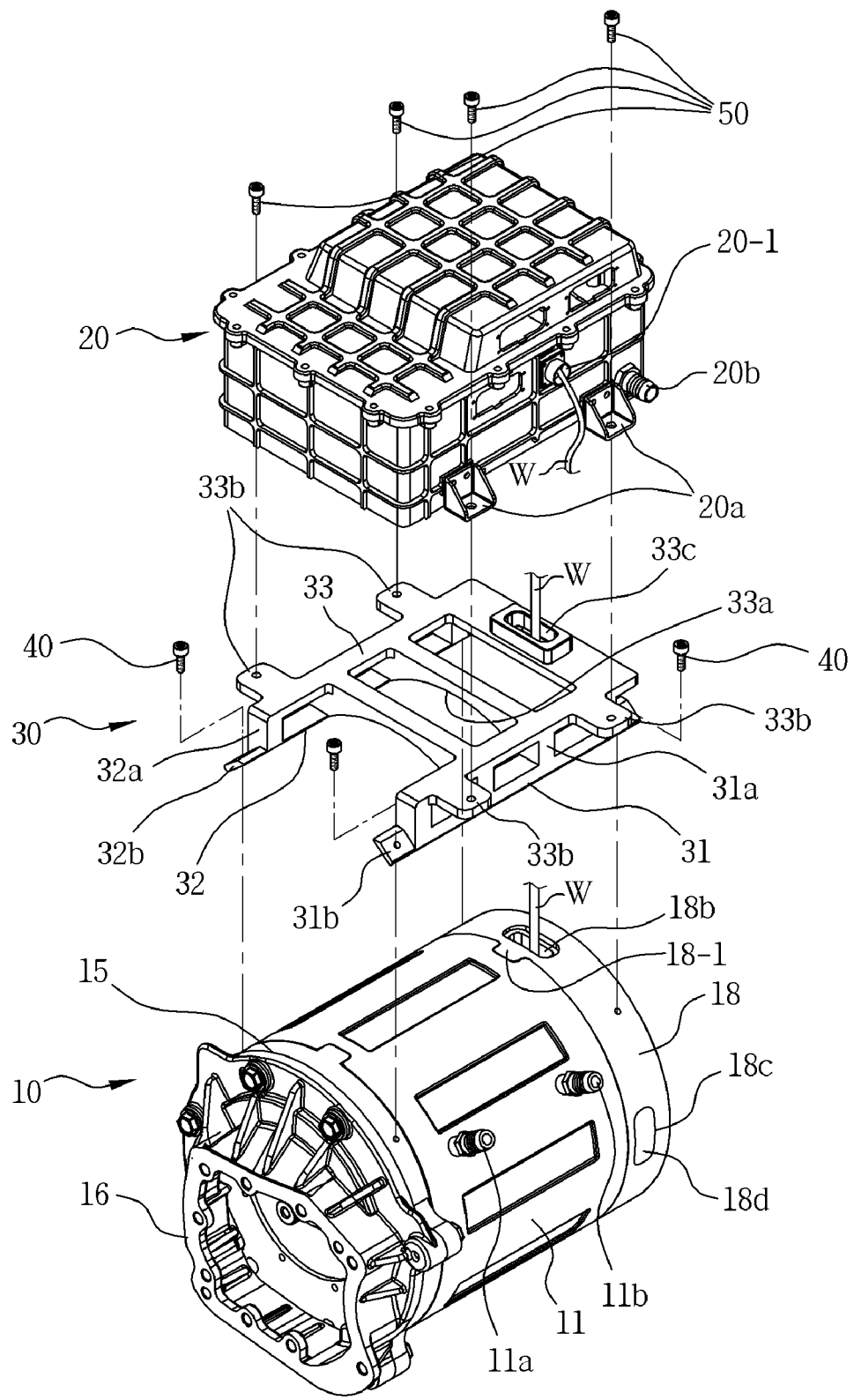

[Fig.4]
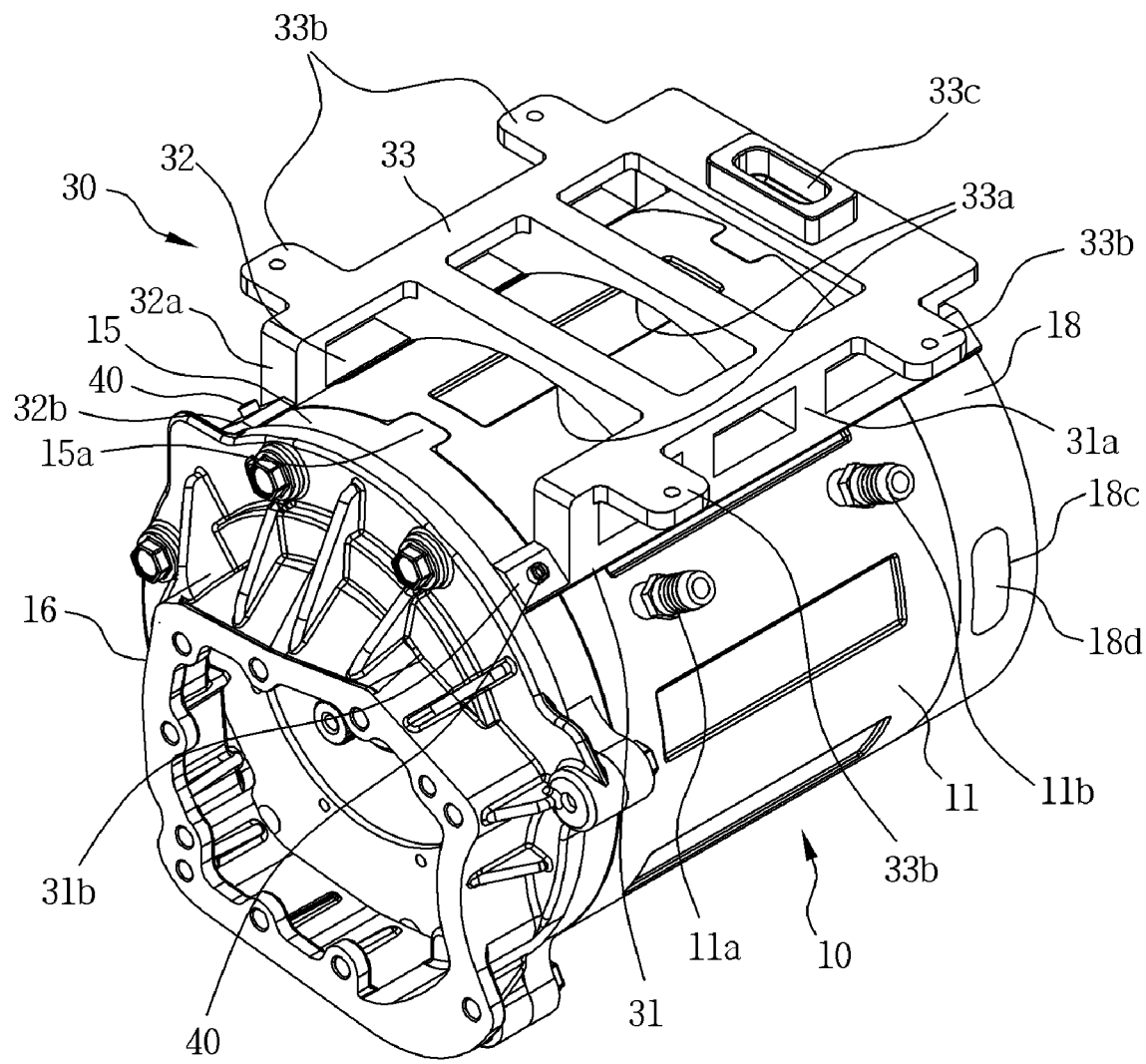

[Fig. 5]
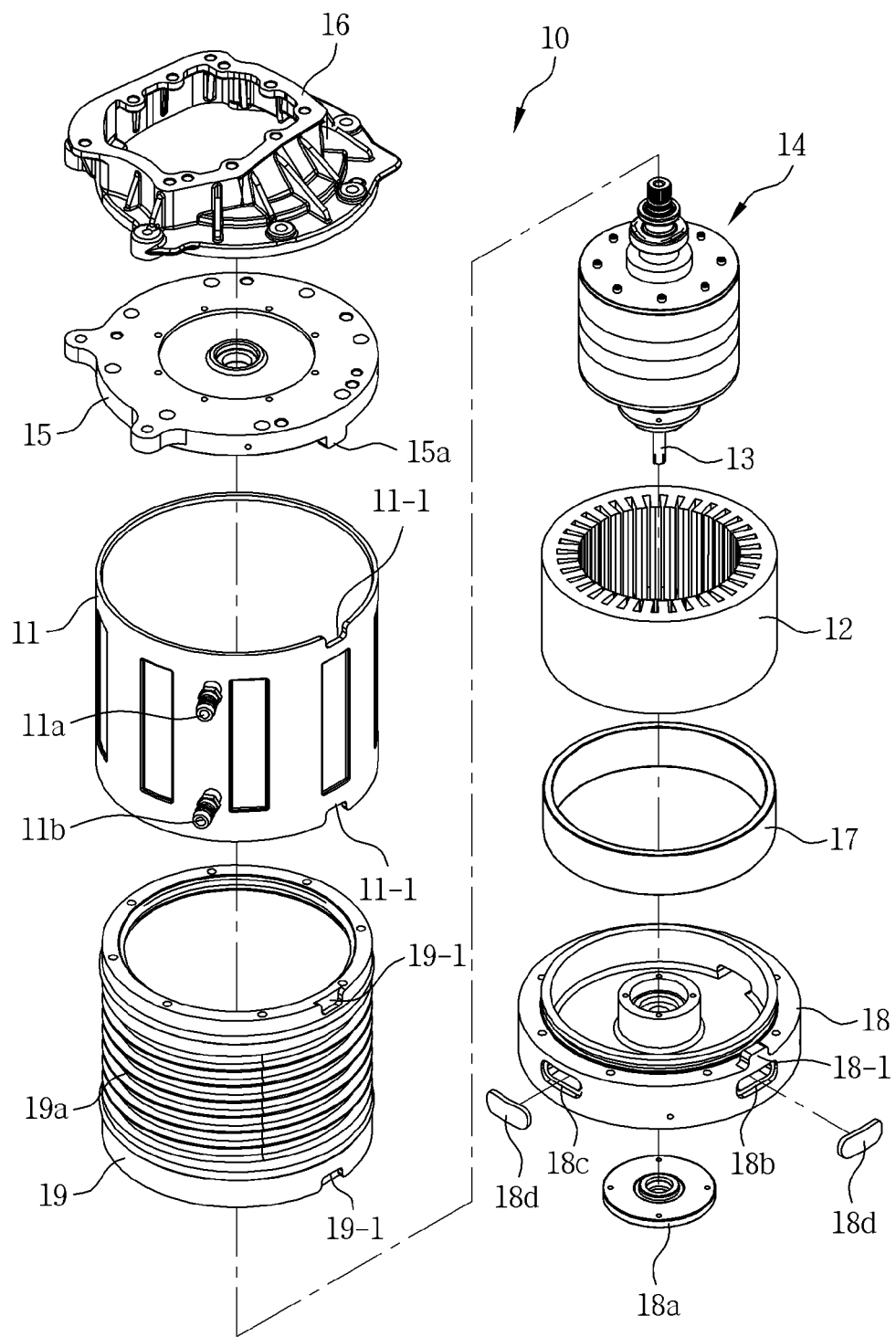

[Fig. 6]
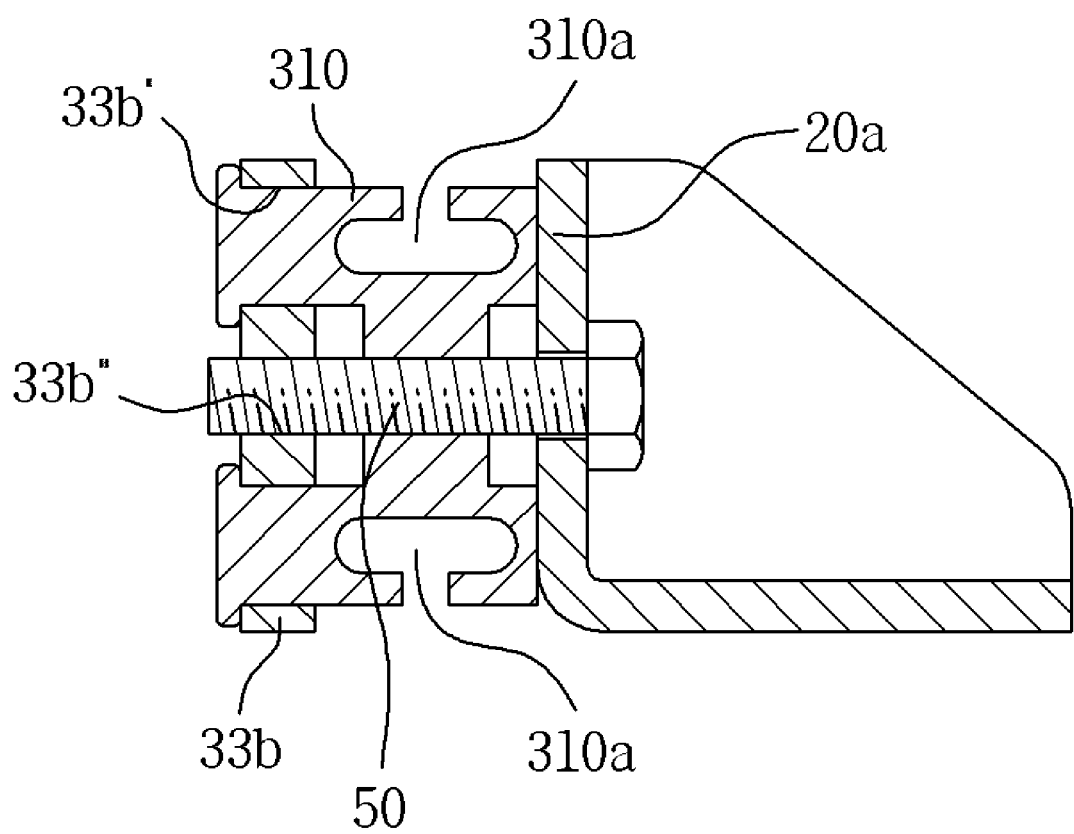

[Fig. 7]
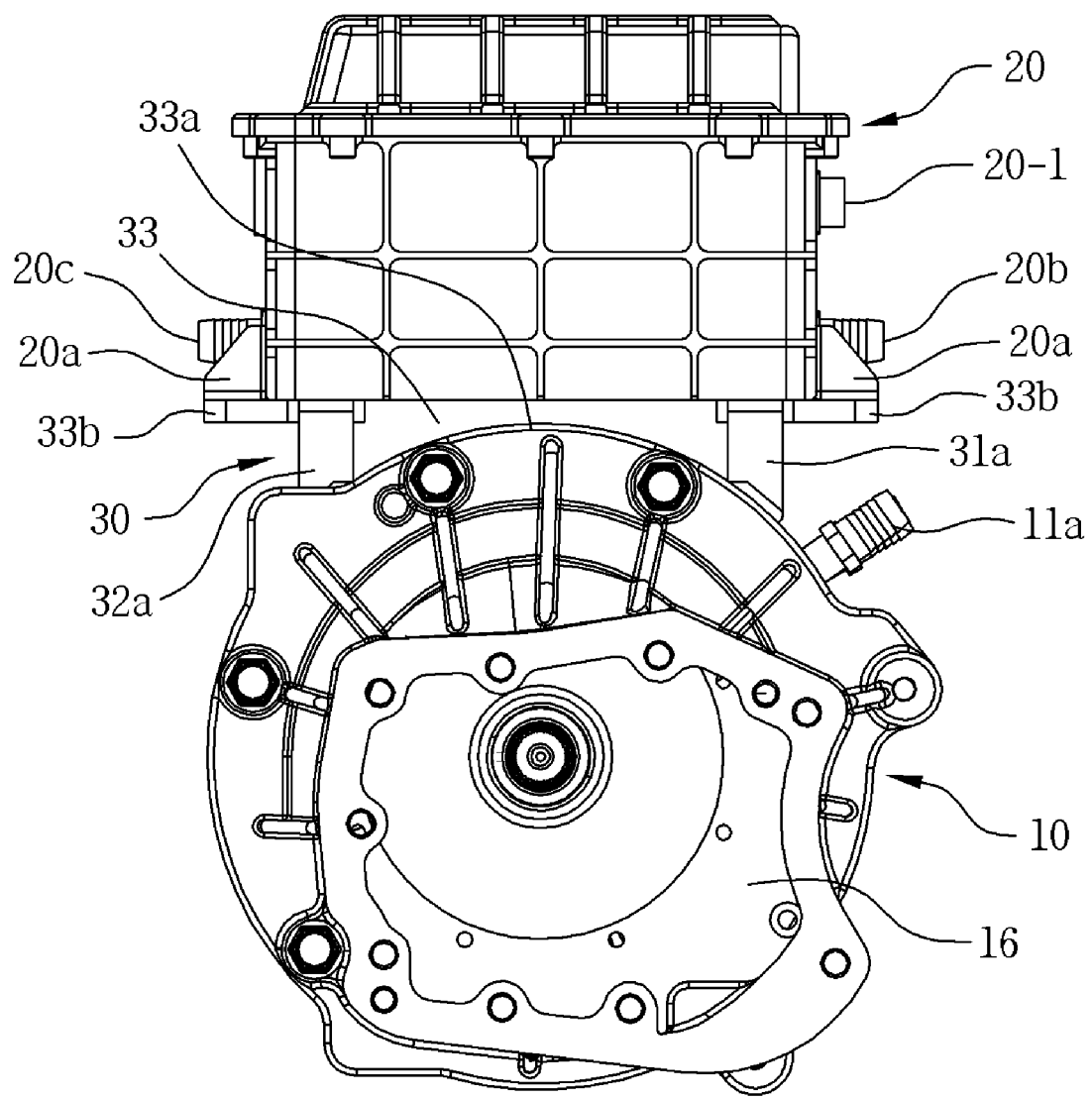

[Fig. 8]
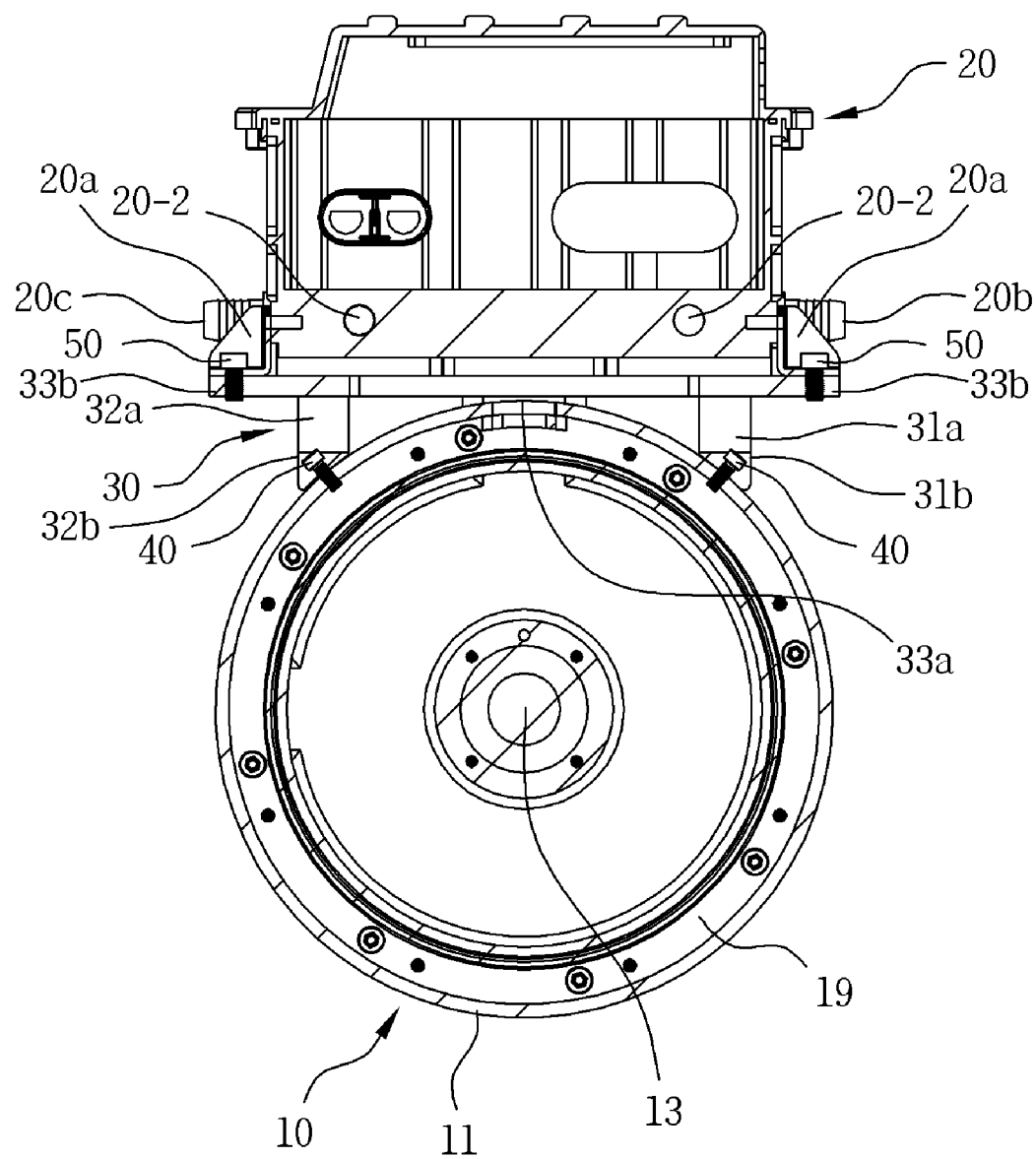

DRIVE MOTOR OF ELECTRIC VEHICLE HAVING INVERTER HOUSING MOUNTED THEREIN

CROSS REFERENCE TO PRIOR APPLICATIONS

This application is the 35 U.S.C. 371 national stage of International application PCT/KR2019/006900 filed on Jun. 7, 2019, which claims priority to Korean Patent Application No. 10-2019-0065520 filed on Jun. 3, 2019. The entire contents of each of the above-identified applications are hereby incorporated by reference.

TECHNICAL FIELD

The present invention relates to a drive motor of an electric vehicle having an inverter housing mounted therein. More specifically, the present invention relates to a drive motor of an electric vehicle which allows the assembly position of the inverter to be changeable in the drive motor, so as to increase the degree of integration of vehicle parts in an installation space inside the vehicle in which the drive motor is installed.

BACKGROUND ART

Recently, eco-friendly vehicles with pure electric power such as electric vehicles or fuel cell vehicles, etc. are attracting attention. Such electrically powered eco-friendly vehicles have a drive motor of an electric vehicle which gains a rotational power from electric energy mounted therein, instead of an internal combustion engine such as the existing engine.

As disclosed in Korean Patent No. 10-1531525, such drive motor may comprise a stator and a rotor, the rotor may rotate relative to the stator through electromagnetic interaction with the stator, a rotary shaft coupled to the rotor may be connected to a drive shaft of a vehicle, and a frame may be provided to surround the stator and the rotor.

The drive motor of such configuration receives DC power through a battery and applies the AC current converted through an inverter to a stator coil and a rotor coil, so as to control the rotating shaft to rotate, and an inverter comprising a drive motor and a controller for controlling the drive motor is installed in the interior space of the vehicle. In this case, since the drive motor and the inverter should be installed in their own designated position, a considerable length of lead wire is required to electrically connect the drive motor and inverter, and depending on the size, it may be difficult to integrate the installation space.

Korean Patent Laid-Open No. 10-2018-0061991 solves the above problem through a structure directly assembling an inverter and a drive motor, so as to increase the degree of integration of parts per unit space.

However, in this prior art, the vibration generated while operating the drive motor may be transferred to the inverter, thereby adversely affecting the circuit parts integrated in the internal circuit board of the inverter and weakening durability. Also, since the inverter is assembled only in one designated position of the drive motor, when the interior space of the vehicle is changed, there is a problem that the structure of the inverter and the drive motor needs to be changed in order to change the position accordingly.

On the other hand, the drive motor, like the engine of an internal combustion engine, may not only generate overheating, but may also generate overheating caused by a voltage amplifying transistor mounted inside the inverter. Accordingly, in prior art, a cooling tube or a cooling water circulation passage is installed and formed to prevent the overheating. However, since each cooling tube or cooling water circulation passage installed to prevent such overheating needs to have a separate cooling water tank corresponding thereto, there may be problems such that there are restrictions in installing a cooling water tank and that a separate circulation pump for cooling water needs to be installed.

DETAILED DESCRIPTION OF INVENTION

Technical Task

It is an object of the present invention to increase the degree of integration of vehicle parts in the same configuration space in correspondence to the shape of the installation space inside a vehicle in which a drive motor is installed by allowing the assembly position of the inverter to be changeable.

It is another object of the present invention to improve the durability of the inverter by minimizing the transfer of heat generated from the drive motor to the inverter.

It is yet another object of the present invention to prevent damage such as part separation and short circuit caused by vibration of the parts inside an inverter by reducing the vibration generated while operating a drive motor.

Means for Solving Technical Task

A drive motor of an electric vehicle having an inverter housing mounted therein according to the present invention is a drive motor of an electric vehicle, which couples an inverter housing 20 to the top or side of a drive motor frame 11 so as to be changeable in position, through an inverter coupling bracket 30 between the drive motor frame 11 and the inverter housing 20, wherein the inverter coupling bracket 30 comprises an inverter housing surface-contacting frame 33 in which support gaps 31a and 32a of first and second floor frames 31 and 32, surface-contacting the circumferential surface of a flange 15 coupled to one end of the drive motor frame 11 and the circumferential surface of a bracket 18 coupled to the other end of the drive motor frame 11 in the longitudinal direction, are integrally formed, and an arc-shaped drive motor frame circumferential surface-contacting portion 33a is formed on the lower surface of the inverter housing surface-contacting frame 33, fixing pieces 31b and 32b inclined inward are formed at the left and right ends of the first and second floor frames 31 and 32, respectively, and a fixing protruding piece 33b is formed at each of the front and rear ends of the inverter housing surface-contacting frame 33.

In the present invention, preferably, first and second withdrawal holes 18b and 18c for guiding a lead wire (W) withdrawn from the inverter housing 20 are formed in the bracket 18, and a temporary stopper 18d made of a rubber material is detachably inserted into any one of the first and second withdrawal holes 18b and 18c.

In the present invention, preferably, a lead wire guide hole 33c is formed on one side of the inverter housing surface-contacting frame 33 of the inverter coupling bracket 30, and the lead wire guide hole 33c corresponds to the first withdrawal hole 18b or the second withdrawal hole 18c of the bracket 18.

In the present invention, preferably, the inverter coupling bracket 30 has an elastic member 310 made of a rubber material having a cushioning force in which a hollow part 310a is formed in the fixing protruding pieces 33b at each of the front and rear ends of the inverter housing surface-contacting frame 33 inserted, and the other end surface of the elastic member 310 is coupled to surface-contact one side surface of the fixing bracket 20a at each of the front and rear ends of the inverter housing 20.

In the present invention, preferably, a cooling water circulation passage 20-2 is formed inside the inverter housing 20, a cooling water inlet 20b and a cooling water outlet 20c connected to the cooling water circulation passage 20-2 are protrudingly formed at both ends of the inverter housing 20, and the cooling water outlet 11b of the drive motor frame 11 and the cooling water inlet 20b of the inverter housing 20 are connected with a cooling water hose.

Effect of the Invention

The present invention has an effect of increasing the degree of integration of parts in the same space inside a vehicle by allowing the assembly position of the inverter housing to be changeable on the top or side of a drive motor frame through an inverter coupling bracket.

Also, the inverter coupling bracket according to the present invention has an effect of improving the durability of the inverter by maintaining a gap between the top or side of the drive motor frame and the bottom surface of the inverter housing so as to minimize the transfer of overheat generated from the drive motor frame to the inverter, thereby preventing damage caused by overheating of the drive motor.

In addition, the present invention has an effect of preventing damage such as part separation and short circuit inside the inverter by granting a vibration absorption function to the inverter coupling bracket to absorb the vibration generated while driving the drive motor and preventing the flow of the inverter housing.

Further, the present invention has an effect of compacting the cooling water circulation system by connecting the cooling water circulation passage formed inside the drive motor frame and the inverter housing with a cooling water circulation hose to prevent overheating of the driving motor and the inverter.

BRIEF DESCRIPTION OF DRAWINGS

FIG. 1 is a perspective view showing a drive motor of an electric vehicle having an inverter housing of the present invention mounted on the top of a drive motor frame;

FIG. 2 is a perspective view showing a drive motor of an electric vehicle having an inverter housing of the present invention mounted on the side of a drive motor frame;

FIG. 3 is an exploded perspective view showing a drive motor frame and an inverter housing according to the present invention;

FIG. 4 is a perspective view showing a state in which an inverter coupling bracket is assembled to a drive motor frame of the present invention;

FIG. 5 is an exploded perspective view showing the inside of the drive motor according to the present invention;

FIG. 6 is a cross-sectional view showing an excerpted part of a state in which the inverter coupling bracket and the inverter housing of the present invention are coupled;

FIG. 7 is a side view showing a state in which the inverter housing of the present invention is mounted on the top of a drive motor frame; and FIG. 8 is a cross-sectional view showing a state in which the inverter housing of the present invention is mounted on the top of a drive motor frame.

Hereinafter, the present invention will be described in detail with reference to the accompanying drawings.

BEST MODE FOR CARRYING OUT THE INVENTION

FIG. 1 is a perspective view showing a drive motor 10 of an electric vehicle having an inverter housing 20 of the present invention mounted on the top of a drive motor frame 11; FIG. 2 is a perspective view showing a drive motor 10 of an electric vehicle having an inverter housing of the present invention mounted on the side of a drive motor frame 11; FIG. 3 is an exploded perspective view showing a drive motor frame 11 and an inverter housing 20 according to the present invention; FIG. 4 is a perspective view showing a state in which an inverter coupling bracket 30 is assembled to a drive motor frame 11 of the present invention; and FIG. 5 is an exploded perspective view showing the inside of the drive motor 10 according to the present invention.

Referring to FIGS. 1 to 5 together, the present invention is characterized in that the assembly position of the inverter housing 20 in the drive motor frame 11 configuring the drive motor 10 is changeable. An inverter housing 20 may be coupled to the top or side of a drive motor frame 11 through an inverter coupling bracket 30 between the drive motor frame 11 and the inverter housing 20. Circuit parts including a voltage amplifying transistor for converting DC power into AC power are integrated inside the inverter housing 20.

A drive motor 10 comprises a drive motor frame 11, a stator 12 fixedly installed inside the drive motor frame 11 to generate magnetic flux, and a rotor 14 arranged in a predetermined air gap with the stator 12 to rotate relative to a rotation shaft 13. A flange 15 and a reducer 16 are installed on one side of the drive motor frame 11, and a stop ring 17, a bracket 18, and a resolver cover 18a are sequentially assembled on the other side. The reducer 16 comprises a plurality of gears to reduce the rotation speed of the rotation shaft 13. For the sake of convenience, the accompanying drawings show only some of the housings of the reducer. The stop ring 16 serves the role of setting the position of the stator 12.

First and second withdrawal holes 18b and 18c for guiding a lead wire (W) withdrawn from the inverter housing 20 are formed on the top and one side of the bracket 18 at predetermined intervals. All of the withdrawal holes 18b and 18c or any one of them may be closed by having a temporary stopper 18d made of a rubber material inserted therein. Of course, the number of withdrawal holes may be formed in a plurality of three or more instead of two.

As shown in FIG. 1, when the inverter housing 20 is coupled to the top of the drive motor frame 11, the temporary stopper 18d is not coupled to the first withdrawal hole 18b, and the lead wire (W) withdrawn from the inverter housing 20 is guided to the first withdrawal hole 18b. As shown in FIG. 2, when the inverter housing 20 is coupled to the side of the drive motor frame 11, the temporary stopper 18d is inserted into the first withdrawal hole 18b, and the lead wire (W) withdrawn from the inverter housing 20 is guided to the second withdrawal hole 18c. The temporary stopper 18d is inserted into the unused second withdrawal hole 18c.

As shown in FIGS. 1 and 2, when the inverter housing 20 is coupled to the top of the drive motor frame 11 and when the inverter housing 20 is coupled to the side of the drive motor frame 11, the coupling may be assembled through an inverter coupling bracket 30 as shown in FIGS. 3 and 4. The inverter coupling bracket 30 comprises first and second floor frames 31 and 32, surface-contacting the circumferential surface of a flange 15 coupled to the drive motor frame 11, the circumferential surface the drive motor frame 11, and the circumferential surface of a bracket 18 in the longitudinal direction, and an inverter housing surface-contacting frame 33 in which support gaps 31a and 32a of first and second floor frames 31 and 32 are integrally formed. An arc-shaped drive motor frame circumferential surface-contacting portion 33a is formed on the lower surface of the inverter housing surface-contacting frame 33, and fixing pieces 31b and 32b inclined inward are formed at the left and right ends of the first and second floor frames 31 and 32, respectively.

A fixing protruding piece 33b may be formed at each of the front and rear ends of the inverter housing surface-contacting frame 33. The inclined fixing pieces 31b and 32b surface-contact the circumferential surface of the flange 15 and the circumferential surface of the bracket 18 to be fixed with a fixing bolt 40. The fixing protruding piece 33b surface-contacts the fixing bracket 20a at each of the front and rear ends of the inverter housing 20 to be fixed with a fixing bolt 50. At this time, inside the arc-shaped drive motor frame circumferential surface-contacting portion 33a, support intervals 31a and 32a and gaps are formed between the arc-shaped drive motor frame circumferential surface-contacting portion 33a and the circumferential surface of the drive motor frame 11 due to the arc shape. Accordingly, the heat transferred to the inverter housing 20 may be minimized even when the heat generated while operating the drive motor 10 is transferred to the surface of the drive motor frame 11, thereby preventing damage caused by overheating of the drive motor 10, and improving the durability of the inverter.

A lead wire guide hole 33c is formed on one side of the inverter housing surface-contacting frame 33 of the inverter coupling bracket 30, and the lead wire guide hole 33c may be configured to correspond to the first withdrawal hole 18b or the second withdrawal hole 18c of the bracket 18. Therefore, as shown in FIG. 3, after withdrawing the lead wire (W) withdrawn from the inverter housing 20 to the first withdrawal hole 18b of the bracket 18, the lead wire is guided through the lead wire guide hole 33c at one side of the inverter housing surface-contacting frame 33, to be in contact with the connection terminal 20-1 of the inverter housing 20. Accordingly, the lead wire (W) may be guided smoothly and connected within a short distance, thereby allowing quick and accurate connection.

FIG. 6 is a cross-sectional view showing an excerpted part of a state in which the inverter coupling bracket 30 and the inverter housing 20 of the present invention are coupled.

As shown in FIG. 6, an elastic member 310 made of a rubber material having a cushioning force in which a hollow part 310a is formed in the fixing protruding pieces 33b at each of the front and rear ends of the inverter housing surface-contacting frame 33 may be applied to the inverter coupling bracket 30. The other end surface of the elastic member 310 is coupled to surface-contact one side surface of the fixing bracket 20a at each of the front and rear ends of the inverter housing 20, so that the elastic member 310 absorbs the vibration generated while driving the drive motor 10, and the hollow part 310a is structurally cushioned to minimize the vibration transferred to the inverter housing 20 and eliminate part separation or short circuit inside the inverter. Also, one side of the elastic member 310 made of a rubber material is insertedly fixed into the fitting hole 33b' formed in the fixing protruding piece 33b, and by a fixing bolt 50 inserted into the fixing hole 33b" with a hole in the center in this state, the fixing brackets 20a at each of the front and rear ends of the inverter housing 20 and the elastic member 310 made of a rubber material are firmly coupled.

In the present invention, in order to enable accurate and quick assembly of the drive motor 10, as shown in FIG. 5, concave parts 11-1 and 19-1 are formed at one of the upper or lower side of the drive motor frame 11 and the inner frame 19, and fitting protruding pieces 15a and 18-1 are formed at a lower part side of the flange 15 and an upper part side of the bracket 18, so that the fitting protruding pieces 15a and 18-1 are assembled in correspondence to the concave part 11-1 and 19-1 when assembling the drive motor 10. Fitting holes into which the fixing bolt 40 is inserted may be formed in advance along the circumferential surface of the flange 15 and the circumferential surface of the bracket 18, which are assembled with the fixing bolt 40, surface-contacting the inclined fixing pieces 31b and 32b of the first and second floor frames 31 and 32 of the inverter coupling bracket 30.

As such, the present invention allows the position of the inverter housing 20 to be changeable in correspondence to the internal space of the vehicle, by allowing the inverter housing 20 to be coupled through an inverter coupling bracket 30 having a vibration absorption function on the top of the drive motor frame 11 of the drive motor 10 as shown in FIG. 1, or by assembling the inverter housing 20 to be coupled at the side of the drive motor frame 11 of the drive motor 10 through an inverter coupling bracket 30 having a vibration absorption function as shown in FIG. 2. Accordingly, the degree of integration of the parts may increase in the same space of the installation space inside a vehicle.

FIG. 7 is a side view showing a state in which the inverter housing 20 of the present invention is mounted on the top of a drive motor frame 11 and FIG. 8 is a cross-sectional view thereof. Referring to FIGS. 5, 7 and 8 together, the present invention forms a cooling water passage 19a along an outer circumferential surface of the inner frame 19 installed between the outer circumference of the stator 12 and the drive motor frame 11. To this end, the inner circumferential surface of the drive motor frame 11 and the outer circumferential surface of the inner frame 19 may be pressed in close contact to prevent leakage, or a cooling water hose may be inserted in a concave-convex part formed along the outer circumferential surface of the inner frame 19.

A cooling water inlet 11a and a cooling water outlet 11b may be protrudingly formed on the outside of the drive motor frame 11, and the cooling water inlet 11a and the cooling water outlet 11b may be connected to a cooling water tank (not shown) so that the cooling water is circulated by a circulation pump (not shown). As shown in FIG. 8, a cooling water circulation passage 20-2 may be formed inside the inverter housing 20, and a cooling water inlet 20b and a cooling water outlet 20c connected to the cooling water circulation passage 20-2 may be protrudingly formed at both ends of the inverter housing 20. The cooling water outlet 11b of the drive motor frame 11 and the cooling water inlet 20b of the inverter housing 20 may be connected by a cooling water hose (not shown) to allow the cooling water to circulate the inside of the drive motor 10 and the inside of the inverter housing 20 and cool, thereby preventing overheating of the drive motor 10 and the inverter housing 20.

It should be noted that the description of the present invention described above is merely an example for understanding the present invention, and is not intended to limit the scope of the present invention. The scope of protection of the present invention is defined by the accompanying claims, and it should be construed that simple modifications or alternations within the scope of the claims fall within the scope of the present invention.

What is claimed is:

1. A drive motor of an electric vehicle having an inverter housing (20) mounted therein, which couples the inverter housing (20) to the top or side of a drive motor frame (11) so as to be changeable in position, through an inverter coupling bracket (30) between the drive motor frame (11) and the inverter housing (20), wherein the inverter coupling bracket (30) comprises an inverter housing surface-contacting frame (33) in which support gaps (31a, 32a) of first and second floor frames (31, 32) are integrally formed, the first and second floor frames (31, 32) surface-contacting the circumferential surface of a flange (15) coupled to one end of the drive motor frame (11) and the circumferential surface of a bracket (18) coupled to the other end of the drive motor frame (11) in the longitudinal direction, and an arc-shaped drive motor frame circumferential surface-contacting portion (33a) is formed on the lower surface of the inverter housing surface-contacting frame (33), fixing pieces (31b, 32b) inclined inward are formed at the left and right ends of the first and second floor frames (31, 32), respectively, in the longitudinal direction, and a fixing protruding piece (33b) is formed at each of the front and rear ends of the inverter housing surface-contacting frame (33) in a direction perpendicular to the longitudinal direction.

2. The drive motor of claim 1, wherein first and second withdrawal holes (18b, 18c) for guiding a lead wire (W) withdrawn from the inverter housing (20) are formed in the bracket (18), and a temporary stopper (18d) made of a rubber material is detachably inserted into any one of the first and second withdrawal holes (18b, 18c).

3. The drive motor of claim 1, wherein a lead wire guide hole (33c) is formed on one side of the inverter housing surface-contacting frame (33) of the inverter coupling bracket (30), and the lead wire guide hole (33c) corresponds to the first withdrawal hole (18b) or the second withdrawal hole 18c of the bracket (18).

4. The drive motor of claim 1, wherein the inverter coupling bracket (30) has an elastic member (310) made of a rubber material having a cushioning force in which a hollow part (310a) is formed in the fixing protruding pieces (33b) at each of the front and rear ends of the inverter housing surface-contacting frame (33) inserted, and the other end surface of the elastic member (310) is in surface-contact with and is coupled to one side surface of the fixing bracket (20a) at each of the front and rear ends of the inverter housing (20).

5. The drive motor of claim 1, wherein a cooling water circulation passage (20-2) is formed inside the inverter housing (20), a cooling water inlet (20b) and a cooling water outlet (20c) connected to the cooling water circulation passage (20-2) are protrudingly formed at both ends of the inverter housing (20), and the cooling water outlet (11b) of the drive motor frame (11) and the cooling water inlet (20b) of the inverter housing (20) are connected with a cooling water hose.

* * * * *